Jan. 21, 1936.   J. A. SHARP   2,028,693
AUTOMATIC RELEASE VALVE
Filed Aug. 31, 1934

Inventor
John A. Sharp
By Clarence A. O'Brien
Attorney

Patented Jan. 21, 1936

2,028,693

UNITED STATES PATENT OFFICE 2,028,693

AUTOMATIC RELEASE VALVE

John A. Sharp, Marshall, Tex.

Application August 31, 1934, Serial No. 742,315

3 Claims. (Cl. 137—53)

This invention relates to an automatic release valve for pressure systems, the general object of the invention being to provide means for automatically opening the system when the pressure becomes excessive and then closing the release means when the pressure drops to normal.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 2:
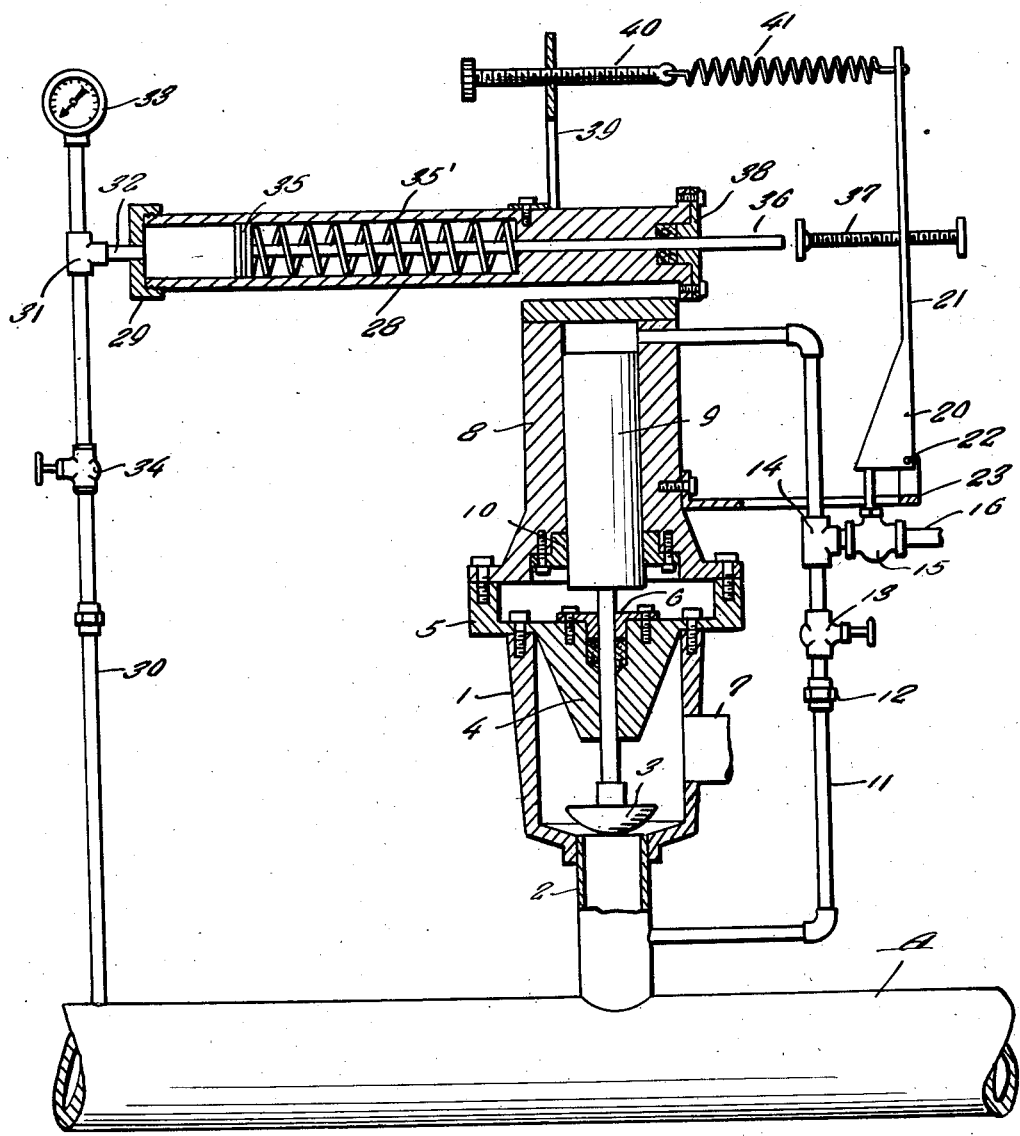
Figure 2 is a sectional view of the valve operated by the rocker member.
Figure 1:
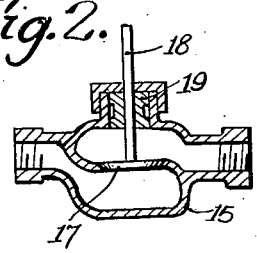
Figure 1 is an elevational view with parts in section showing the invention applied to a pressure supply.

In the drawing, the letter A indicates a portion of the pressure line and the numeral 1 indicates a casing which is connected with the line by the short pipe 2. The junction of the pipe with the bottom of the casing forms a seat for a valve 3 the stem of which passes through a substantially conical part 4 formed on a box-like cover 5 which is bolted to the top of the casing, a packing gland 6 being provided for the stem where it passes through the bottom of the cover, the gland having its upper portion located in the opening or chamber formed by the cover. A discharge pipe 7 is connected with the casing above the valve seat. A cylinder 8 is connected to the top of the cover and contains a piston 9 with a packing 10 at the bottom of the cylinder through which the lower part of the piston passes. As it will be seen the lower end of the piston contacts the upper end of the valve stem. A pipe line 11 connects the pipe 2 with the top of the cylinder 8 and contains a screen 12, a manually operated gate or needle valve 13 which is located above the screen and a T-coupling 14 which is located above the valve. A valve casing 15 is connected to the coupling and a discharge pipe 16 leads from the casing, the casing containing a downwardly closing valve 17 the stem 18 of which passes through the gland 19 in the top of the casing 15 with the upper end of the stem engaged by the wide base part 20 of a rocking lever 21 pivoted as at 22 to a supporting member 23 attached to the cylinder 8. A cylinder 28 has a cap 29 which closes one end thereof and a pipe line 30 leads from the pressure line A in advance of the pipe 2 and is in communication with the cylinder 28 by means of the coupling 31 and the pipe 32 which passes through the cap 29. A pressure gauge 33 is connected to the coupling and the pipe line 30 contains a needle valve 34. A plunger 35 is located in the cylinder 28 and has its stem 36 passing through that end of the cylinder 28 which is opposite the end closed by the cap 29 and said stem 36 is adapted to be engaged by a screw 37 which is threaded through a hole in the lever 21, packing means 38 being arranged at said end of the cylinder 28 through which the stem 36 passes.

A bracket 39 is attached to the cylinder 28 and contains a threaded hole through which passes an adjusting screw 40 for a spring 41 which is connected to the upper end of the lever 21.

The principle of the invention is to create a differential in pressure or power between the release valve 3 and the plunger or piston 9 which controls the valve. In order to create this differential the piston or plunger 9 has a pressure area larger than the effective pressure area of the inlet side of the valve 3 so that when pressure passes through the line 11 into the upper end of the cylinder 8 said plunger or piston 9 will be forced downwardly thus closing valve 3 against the main line pressure.

When pressure increases in the main line A the pressure also increases in the cylinder 28 as this cylinder is connected with the main line A by means of the pipe line 30. This increased pressure forces the plunger 35 against the action of its spring 35' and causes the stem 36 to strike the screw 37, thus rocking the lever 21 on its pivot so that the valve 17 in the casing 15 is released which permits pressure in the line 11 and in the cylinder 8 to raise the valve 17 which results in releasing pressure in the top of the cylinder 8 so that the main line pressure will raise the valve 3 so that some of the main line pressure fluid can escape through the pipe 7. As soon as the main line pressure falls back to normal the spring 41 will return the lever 21 to its normal position closing the valve 17 and the spring 35' will move the plunger 35 back to its normal position, thereby causing the pressure to equalize in the cylinder 8 and the main line so that the plunger 9 will close the valve 3.

The purpose of the valve 13 is to check the flow through the pipe 11 into the cylinder 8 so that the cylinder will fill slowly but as soon as the valve 17 is open the cylinder will quickly drain. The exhaust pipe 7 may be a by-pass line and the adjusting screw 37 will permit the parts to be set according to the desired pressure to be maintained in the line, this pressure being registered by the gauge 33. The valve 34 in the pipe 30 permits the flow of compressed fluid through the said pipe to the cylinder 38 to be regulated so as to minimize the surge in the system caused by the pumps of the system.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. An automatic release valve for pressure systems comprising a valve casing adapted to be placed in communication with the system and having a discharge, a valve member having a stem for controlling communication through the casing, a cylinder mounted on the casing, a plunger therein contacting the valve stem and tending to close the valve member, a pipe line for connecting the cylinder above the plunger with the system, said plunger having a pressure area larger than the effective pressure area of the inlet side of the valve member whereby the pressure fluid entering the cylinder from the system will cause the plunger to hold the valve member closed, a pressure opened valve member in communication with the pipe line, a spring actuated member for normally holding the last-mentioned valve member closed, a second cylinder adapted to be placed in communication with the system at a point in advance of the first mentioned valve member, a plunger in the said second cylinder operated by the pressure fluid entering the same, a spring for resisting movement of the second mentioned plunger caused by said pressure fluid and means for operating the spring actuated member by the second mentioned plunger when said plunger has moved a predetermined distance by excessive fluid pressure in the system.

2. An automatic release valve for a pressure system comprising a valve casing adapted to be placed in communication with the system and provided with a discharge, a valve member having a stem for controlling communication through the casing, a cylinder mounted on the casing, a plunger therein contacting the valve stem, a pipe line for connecting the cylinder above the plunger with the system, said plunger having a pressure area larger than the effective pressure area of the inlet side of the valve member whereby the pressure fluid entering the cylinder will cause the plunger to hold the valve member closed, a discharge connected with the pipe line, a valve member in the discharge and adapted to be opened by pressure fluid in the line, a lever mounted adjacent the second valve member, an adjustable spring for normally holding the lever in position for closing the last mentioned valve member, an adjustable member carried by the lever, a second cylinder, a pipe line for connecting one end thereof with the system at a point in advance of the first valve member, a spring-pressed plunger in the second cylinder having a stem adapted to engage the adjustable member carried by the lever when the plunger is moved a predetermined distance against the action of the adjustable spring by said pressure fluid in the system.

3. An automatic release valve for a pressure system comprising a valve casing adapted to be placed in communication with the system and provided with a discharge, a valve member having a stem for controlling communication through the casing, a cylinder mounted on the casing, a plunger therein contacting the valve stem, a pipe line for connecting the cylinder above the plunger with the system, said plunger having a pressure area larger than the effective pressure area of the inlet side of the valve member whereby the pressure fluid entering the cylinder will cause the plunger to hold the valve member closed, a discharge connected with the pipe line, a valve member in the discharge and adapted to be opened by pressure fluid in the line, a lever mounted adjacent the second valve member, an adjustable spring for normally holding the lever in position to close the last mentioned valve member, an adjustable member carried by the lever, a second cylinder, a pipe line for connecting one end thereof with the system at a point in advance of the first valve member, a spring-pressed plunger in the second cylinder having a stem adapted to engage the adjustable member carried by the lever when the plunger is moved a predetermined distance by said pressure fluid in the system, and a manually operated valve in the first mentioned pipe line between the system and the second mentioned valve member for checking the flow of fluid from the system into the second mentioned cylinder and permitting the fluid to readily escape from the second mentioned cylinder when the second valve is open.

JOHN A. SHARP.